Feb. 27, 1951        S. S. BROWN        2,543,149

ELECTRIC MOTOR AND METHOD OF OPERATING MOTORS

Filed Aug. 3, 1949        2 Sheets-Sheet 2

INVENTOR
STEFFEN S. BROWN
by
ATTORNEYS

Patented Feb. 27, 1951

2,543,149

UNITED STATES PATENT OFFICE 2,543,149

ELECTRIC MOTORS AND METHOD OF OPERATING MOTORS

Steffen S. Brown, Dayton, Ohio, assignor to The Brown-Brockmeyer Company, Dayton, Ohio, a corporation of Ohio Application August 3, 1949, Serial No. 108,315

2 Claims. (Cl. 318—196)

This invention relates to electrical apparatus, and particularly to electric motors, especially alternating current motors of the repulsion or induction type or a combination thereof.

Alternating current motors, particularly the smaller size of the type referred to generally operate rather inefficiently in that they have a low power factor, and when a large number of these motors are operated together, as, for example, in a factory or shop having a number of individually powered machines and appliances, a rather heavy current load is placed on the power lines without a corresponding amount of power being generated.

Due to the fact that a motor of this nature draws a higher current than its power output indicates, due to its lagging power factor, the copper loss is disproportionately high, and for this reason the motor has a tendency to run hotter than if its power factor were higher, thereby requiring more efficient cooling means than would otherwise be needed.

Certain types of electric motors, such as capacitor motors, at least partially overcome these difficulties by including in circuit with the motor a condenser which draws a leading current from the power line and thereby improves the overall power factor of the motor, leading to more efficient operation thereof and improving the load characteristics of the said power line.

While capacitor type motors do have the advantage referred to above, they are not preferred in a number of installations, because generally they do not have a high enough starting torque proper to power certain types of loads, such as compressors, machine tools, and other loads where full working torque is required in order to bring the motor up to speed.

In installations requiring a high starting torque motor, a motor having repulsion starting characteristics is much to be preferred, because it can be adjusted to have a high starting torque and will therefore, come up to speed quickly, even though under full load.

The most common types of motors are the repulsion start induction run and the repulsion induction motor, and, in most instances these motors start as repulsion motors and thereafter run at constant speed. The most widely used of these types of motors is the repulsion start-induction run motor which is characterized by having means to short circuit the commutator at a predetermined speed.

Motors of the types referred are, however, characterized by the disadvantages of a low power factor and inefficient operation, and the primary object of this invention is to provide an arrangement especially adapted for use with single phase alternating current motors for overcoming these disadvantages.

Another object is the provision of auxiliary means for repulsion and induction motors which substantially improves the power factor thereof, thus leading to more efficient operation of the motor.

Another object is the provision of an arrangement for use with repulsion and induction motors which results in a cooler operating motor and one which operates with less noise and with better efficiency.

Another object is the provision of an auxiliary winding for a repulsion or an induction motor which draws a leading current from the line, thereby improving the efficiency and operating characteristics of the motor.

Still another object is the provision of an auxiliary winding in a repulsion or an induction motor which does not detract from the starting torque but which leads to more efficient operating characteristics of the motor.

A particular object is the embodiment of an arrangement for improving the power factor in a repulsion start-induction run motor.

Another particular object is the utilization of the movement of the brush holder in a brush lifting type of repulsion start-induction run motor for making a power factor improving compensating arrangement effective.

These and other objects and advantages will become more apparent upon reference to the following description taken in connection with the accompanying drawings in which:

Figure 1 is a view of the commutator end of a typical repulsion start-induction run motor showing a switch arrangement for controlling the auxiliary winding of this invention;

Figures 2, 3, and 4 are diagrammatic views showing different manners in which my invention can be adapted to a repulsion start-induction run motor.

In general, my invention comprises the provision in a repulsion or induction motor of an auxiliary winding of the same number of poles as the main field winding, but in quadrature therewith, in series with a capacitor and connected in parallel with the main winding. The effect of the auxiliary winding is to establish a more uniform field for the rotor to turn in, thereby reducing the noise of operation of the motor and raising the overall efficiency of the motor.

At the same time, the capacitor-auxiliary winding branch will draw a leading current from the line which will improve the overall power factor of the motor, again leading to more efficient operation. The improvement in the power factor of the motor results in its drawing a smaller current from the line, and this is of definite advantage, particularly where a great number of repulsion start-induction run motors comprise the principal power load.

The aforementioned auxiliary winding preferably has a fewer number of turns than the main winding and may also comprise a smaller wire size. The capacitor which is in series with the auxiliary winding is any suitable continuous duty type, such as an ordinary oil-filled condenser.

The auxiliary winding may be continuously energized all the time the motor is in use, but it is preferable for the winding to be out of the circuit during the starting period of the motor, because it has a tendency to detract from the starting torque. When the winding is out of the circuit during the starting period, it is automatically connected in parallel with the main stator winding when the motor has come up to speed.

It will be understood that this invention is effective in repulsion motors and in all types of single phase induction motors. The particular motor shown in the drawings is a repulsion start-induction run motor because this is probably the most widely used type, but this is not intended to indicate any limitation of utility of my invention.

Inasmuch as repulsion start-induction run motors include centrifugal means for short-circuiting the commutator when the motor comes up to speed, this centrifugal means can be employed as the agent for connecting the auxiliary winding in circuit.

Referring now to the drawings somewhat more in detail, Figure 1 shows the commutator end of a typical repulsion start-induction run motor. The particular arrangement shown is that of a brush lifter type motor, but it will be understood that this invention is also contemplated for use in connection with the types of induction motors where the brushes ride on the commutator at all times.

In Figure 1, the motor frame is indicated at 10 and supports the stator iron 12, on which is wound the main field winding 14 and in quadrature therewith, the auxiliary winding, not shown in Figure 1.

Rotatably mounted in the stator 12 is armature 16 which is of the wound type and includes a commutator 18, preferably of the radial segment type. A brush ring 20 is supported adjacent the commutator 18 and includes pockets within which are slidable brushes 22 that bear on the commutator and conduct current during the repulsion starting period of the motor.

Within commutator 18 is a short-circuiter arrangement comprising a plurality of short-circuiter segments 24 mounted in an annular carrier that moves the segments to and from short-circuiting engagement with the commutator. A centrifugal actuator for moving the short-circuiter into engagement with the commutator and simultaneously lifting the brushes from the commutator is generally indicated at 26 and comprises a plurality of weights 28 which are pivotal about their corners 30, so that they move outwardly within their enclosing housing when the armature reaches a predetermined speed of operation.

When the said weights move outwardly they actuate a member 32 outwardly against a spring 34, and thereby move the short-circuiter into effective position against the commutator and also move brush ring 20 away from the commutator so as to lift the brushes therefrom. This part of the operation of the motor is well known and consists of the usual functions carried out in a repulsion start-induction run motor as it comes up to speed.

According to my invention, there is provided a switch in circuit with the auxiilary winding, and this switch may comprise a pair of contacts 36 mounted on a suitable insulating carrier 38 that is fixed to the inner side of end bell 40. The other part of the switch comprises a blade 42 adjustably mounted on an insulating arm 44 attached to brush ring 20. It will be evident that when the brush ring is in its Figure 1 position, the switch will be open, whereas, when the brush ring moves to the position it occupies when the motor is operating as an induction motor, the said switch will be closed.

Referring now to Figures 2, 3, and 4, Figure 2 illustrates diagrammatically the arrangement of the main and auxiliary windings, the aforementioned capacitor, and the switch described in connection with Figure 1. In Figure 2, the auxiliary winding is indicated at 46, and it will be seen that it is connected in series with a capacitor 48 and the previously referred to switch comprising contacts 36 and blade 42. The serial arrangement of capacitor, auxiliary winding and switch is connected in parallel with main field winding 14 across power lines L1 and L2.

In operation, when the motor is connected across the power line, it will start as a repulsion motor with the auxiliary winding out of circuit, due to the fact that blade 42 is spaced from contacts 36. However, when the motor comes up to speed and the centrifugal actuator operates to throw in the short-circuiter and to lift the brushes from the commutator, blade 42 will be moved into engagement with contacts 36, and, thus, connect auxiliary winding 46 and capacitor 48 in parallel with main winding 14. The result of this, as explained before, is to set up a field which will rotate with the armature, thereby producing the quiet and more efficient operation of the motor and also establishing a leading component of current from the supply line which reduces the current requirements of the motor and improves the power factor.

It will be understood that with motors where it is not desired to lift the brushes from the commutator, other switch means could be provided for being closed by the centrifugal actuator when the motor comes up to speed. Also, other mechanical or electrical means could be employed for connecting the auxiliary winding in circuit at the proper time according to well known practices.

Figure 4 shows an arrangement like Figure 3, except that whereas Figure 3 is a single voltage motor, Figure 4 is adapted for being used on either of two voltages, by virtue of the fact that the main field winding is divided into parts 14a and 14b which can be connected in parallel for one voltage, or in series for twice that voltage.

Figure 1:
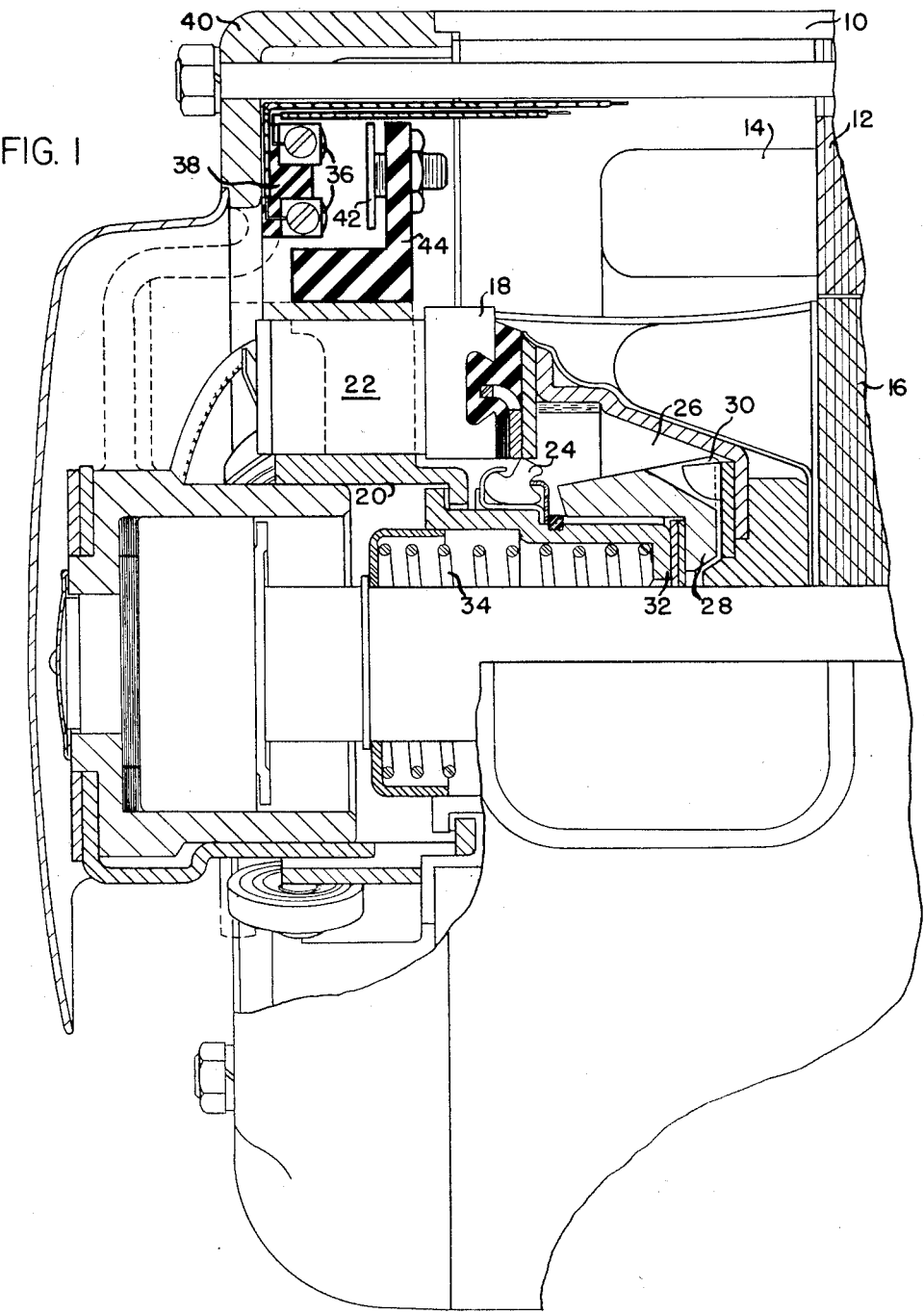
Figure 2:
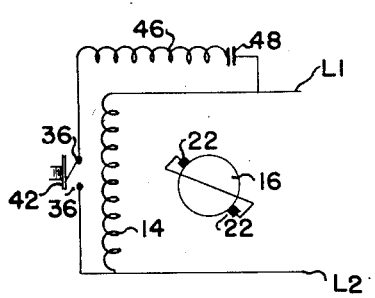
Figure 3:
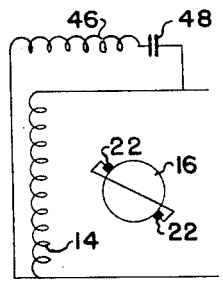
Figure 3 shows an arrangement similar to Figure 2, except that the auxiliary winding 46 is in circuit all of the time, thereby eliminating the need for an extra switch in the motor. This leads to a somewhat more inexpensive construction but also one in which the starting torque of the motor is somewhat impaired, because the auxiliary winding is in circuit all the time the motor is energized.
Figure 4:
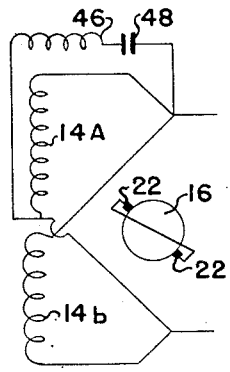

It will be observed that all the arrangements shown in Figures 2, 3, and 4 are characterized by the auxiliary winding arranged in quadrature with the main winding and having a capacitor in series therewith. This arrangement leads to the beneficial results referred to previously.

It will be understood that this invention is susceptible to modification in order to adapt it to different usages and conditions, and, accordingly, it is desired to comprehend such modifications within this invention as may fall within the scope of the appended claims.

I claim:

1. In a single phase electric motor of the repulsion start-induction run type; a stator and a wound rotor, said stator having a main field winding thereon and an auxiliary winding displaced substantially 90 degrees therefrom, a brush ring supported adjacent the commutator of the rotor and a short-circuiter for said commutator, means to energize said main winding to cause said motor to start as a repulsion motor, centrifugal means on said rotor responsive to a certain speed thereof to make said short-circuiter effective for short-circuiting the commutator to cause said motor to run as an induction motor, and auxiliary winding; a capacitor and a normally open switch connected in series, a part of said switch being mounted on a member secured to said ring, and means upon movement of said centrifugal means for moving said ring and member an amount sufficient to lift said brushes from the commutator and to close said switch and thereby connect said main winding in parallel with said auxiliary winding and capacitor.

2. In combination with a brush lifter type repulsion start-induction run motor, an auxiliary winding on the stator of the motor of the same number of poles as the main winding thereof but displaced 90 electrical degrees therefrom, a capacitor in series with said auxiliary winding, a normally open switch in series with said capacitor and auxiliary winding, a short-circuiter for the commutator of said motor, a brush ring supported adjacent said commutator, a centrifugal actuator on the rotor of the motor operable at a predetermined rotor speed to move said short-circuiter into effective position and to move said ring an amount sufficient to lift the brushes of the motor from the commutator, and means responsive to the said lifting of the brushes for closing said switch, said last named means including a member secured to said ring and upon which a part of said switch is adjustably mounted.

STEFFEN S. BROWN.

REFERENCES CITED

The following references are of record in the file of this patent:

UNITED STATES PATENTS

| Number | Name | Date |
|---|---|---|
| 1,725,553 | Ballman | Aug. 20, 1929 |
| 1,726,230 | Kennedy | Oct. 15, 1929 |
| 1,894,805 | Weichel | June 17, 1933 |
| 1,905,773 | Weichel | Apr. 25, 1933 |
| 1,934,909 | Bretch | Nov. 14, 1933 |
| 2,461,717 | Boelsums | Feb. 15, 1949 |